United States Patent [19]

Braemer

[11] Patent Number: 4,556,680
[45] Date of Patent: Dec. 3, 1985

[54] METHOD OF PRODUCING ANTISTATIC EXPANDABLE POLYSTYRENE PRODUCTS

[75] Inventor: Mark C. Braemer, West Trenton, N.J.

[73] Assignee: BASF Wyandotte Corporation, Wyandotte, Mich.

[21] Appl. No.: 527,900

[22] Filed: Aug. 30, 1983

[51] Int. Cl.$^4$ ............................................. C08J 9/22
[52] U.S. Cl. ..................................... 521/57; 428/222; 521/58; 521/60
[58] Field of Search ..................... 521/57, 58; 427/222

[56] References Cited

U.S. PATENT DOCUMENTS

| | | | |
|---|---|---|---|
| 3,560,414 | 2/1971 | Miskel, Jr. et al. | 521/57 |
| 3,817,879 | 6/1974 | Walter et al. | 521/57 |
| 4,255,525 | 3/1981 | Rigler et al. | 521/57 |
| 4,302,549 | 11/1981 | Crowley | 521/57 |
| 4,438,058 | 3/1984 | Tanaka | 521/57 |

*Primary Examiner*—Morton Foelak
*Attorney, Agent, or Firm*—Norbert M. Lisicki

[57] ABSTRACT

Polystyrene beads having antistatic properties are prepared by adding the antistatic compounds to the beads during the pre-expansion step. The beads may then be employed to prepared molded products without any further treatment with antistatic agents.

5 Claims, No Drawings

METHOD OF PRODUCING ANTISTATIC EXPANDABLE POLYSTYRENE PRODUCTS

DISCLOSURE OF THE INVENTION

1. Field of the Invention

This invention relates to polystyrene polymers and to methods of minimizing electrostatic charges thereon. More particularly, the invention relates to methods of imparting antistatic properties to expandable polystyrene beads during the pre-expansion step.

2. Prior Art

All of the prior art teaches methods of rendering polystyrene surfaces having antistatic properties by dipping or spraying techniques, which are slow, and costly. Among these should be noted U. S. Pat. Nos. 2,727,831; 3,575,903; 3,764,376; 3,415,661; 3,419,640; 3,936,422; and 3,873,645. None of the prior art teaches that antistatic materials may be added to expandable polystyrene beads prior to preexpansion.

DESCRIPTION OF THE PREFERRED EMBODIMENTS

Polystyrene beads in the sense of this invention are those beads of styrene polymers and mixed polymers of styrene which contain at least 50 percent by weight of styrene in polymerized form. Included among the co-monomers are α and p methylstyrene, acrylonitrile, methacrylonitrile, esters of acrylic acid and methacrylic acid, butadiene, and small quantities of divinylbenzene. Molding materials may also contain polymers of butadiene, ethylene or acrylic esters.

Additionally, the beads may contain flame retardants. These are organic chlorine and bromine compounds which preferably contain at least 50 percent by weight of chlorine or bromine. Examples of flame retardants include chloroparaffin, 1,2,5,6,9,10-hexabromocyclododecane, tetrabromodibenzalacetane, pentabromophenylallylether, pentabromomonochlorocyclohexane, 1,1,2,3,4,4-hexabromobutene-2, 2,5-bis (tribromomethyl)-1,3,4-thiadiazol, 2,4,6-tris(tribromomethyl)-1, 3,5 triazine, tetrabromoehane, bromotrichloromethane, 1,2,5,6-tetrabromohexane, hexabromobenzene, pentabromophenol, pentabromodiphenylether, trisdibromopropyl)-phosphate, octabromocyclohexadecane, and α-bromonaphthalene. The amount of flame retardant agent employed ranges from 0.1 to 5 percent by weight based on the weight of the polystyrene.

Expandable polystyrene beads generally contain blowing agents. Blowing agents which may be used include aliphatic or cycloaliphatic hydrocarbons and halogenated hydrocarbons such as butane, pentane, hexane, heptane, cyclohexane, methyl chloride and dichlorodifluoromethane. Also suitable are blowing agents which decompose at elevated temperatures and form gases. Among these are azodicarbonamide or sodium bicarbonate. The concentration of blowing agent ranges from 3 to 15 percent by weight based on the weight of polystyrene polymer.

The polystyrene beads are produced by methods well known to those skilled in the art. The most commonly employed method for producing expandable polystyrene beads is the suspension polymerization process, which utilizes liquid styrene monomer, dispersed in an aqueous medium containing blowing agent and a polymerization catalyst. The dispersion is heated for a predetermined time and temperature producing high molecular weight beads. The beads are then filtered, washed and dried. The bead sizes may vary in diameter from 0.01 to 0.1 inches. The beads are then pre-expanded until the desired density is obtained. The pre-expansion may be conducted by means of steam, hot water, hot air or other heat sources. The desired quantity of antistatic agent may be added as a solution during the pre-expansion operation or if steam is the heat source, then the antistatic agent may be added simultaneously with the steam. An effective amount of antistatic agent is employed. Generally, the concentrations range from about 0.05 to 1.0 weight percent based on the weight of polystyrene polymer. Preferably, the concentrations employed range from about 0.1 to 0.5 weight percent based on the weight of polystyrene polymer.

The antistat compounds which are particularly suited in the process of the invention are N,N-bis(2-hydroxyethyl)-N-(3-dodecyl-2-hydroxypropyl) methylammonium methosulfate,stearamidopropyldimethyl-B-hydroxyethylammonium nitrate,hydrogenated tallow primary amine containing 16 to 18 carbon atoms, and a fatty alcohol phosphate having a formula KO(Q-O)$_4$-K wherein Q is

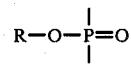

in which R is $C_{12}$ to $C_{16}$.

The following examples are intended to exemplify the invention.

Abbreviations employed in the Examples are as follows:

Antistat A is N,N-bis(2-hydroxyethyl)-N-(3-dodecyl-2-hydroxypropyl)methylammonium methasulfate Antistat B is stearamidopropyldimethyl-B-hydroxyethyl-ammonium nitrate Antistat C is a hydrogenated tallow primary amine containing 16 to 18 carbon atoms Antistat D is a fatty alcohol phosphate having a formula KO(Q-O)$_4$-K wherein Q is

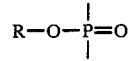

in which R is $C_{12}$ to $C_{16}$

EXAMPLE 1–4

Polystyrene beads having a bead size diameter range of 0.02 to 0.05 inches were fed into a pre-expansion chamber simultaneously with a solution of an antistatic compound as designated below. A steam pressure of 15 psig at 212° F. was employed. The expanded lower density beads were discharged through the top of the chamber and air conveyed to storage bins for aging. The aging time was at least 24 hours at room temperature. The polystyrene was then molded into test specimens using a Springfield molding press employing 18 psig pressure at a temperature of 225° F. The test samples were exposed to an applied charge of 5000 volts as per the military specification MIL-B-81705B. All of the samples treated decayed to a static charge of 500 volts in less than 2 seconds.

TABLE

| Antistat | Solvent, % | Concentration of Antistat |
|---|---|---|
| A | water, 25 | 1 gm/lb. of polystyrene |
| B | water, 25 | 1 gm/lb. of polystyrene |
| C | isopropyl alcohol, 20 | 1 gm/lb. of polystyrene |
| D | isopropyl alcohol, 20 | 1 gm/lb. of polystyrene |

COMPARATIVE EXAMPLES A & B

The process of Examples 1–4 was employed to prepare the samples of comparative Examples A & B with the exception that no antistat compound was added during the pre-expansion steps.

Example A — decayed to a charge greater than 500 volts and remained at this level for greater than 1 minute.

Example B — decayed to a charge of 500 volts in a time greater than 2 seconds.

The embodiments of the invention in which an exclusive privilege or property is claimed are defined as follows 1. A process for the preparation of static-free polystyrene beads comprising, treating the polystyrene beads with an effective amount of an antistatic agent wherein said antistatic agent is added to a pre-expansion chamber simultaneously with steam.

2. The process of claim 1 wherein said antistatic agent is employed at a concentration range of about 0.05 to about 1.0 weight percent based on the weight of polystyrene.

3. The process of claim 1 wherein said antistatic agent is employed at a concentration range of about 0.1 to about 0.5 weight percent based on the weight of polystyrene.

4. The process of claim 1 wherein said antistatic agent is selected from the group consisting of stearamidopropyldimethyl-B-hydroxyethylammonium nitrate, N,N-bis(2-hydroxyethyl)-N-(3-dodecyloxy-2-hydroxypropyl)methylammonium methosulfate, hydrogenated tallow amine and a fatty alcohol phosphate having a formula KO(Q-O)$_4$-K wherein Q is

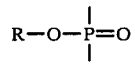

in which R is C$_{12}$ to C$_{16}$.

5. The process of claim 1 wherein said antistatic agent is N,N-bis(2-hydroxyethyl)-N-(3-dodecyloxy-2-hydroxypropyl)methylammonium methosulfate.

* * * * *